United States Patent
Chen et al.

(10) Patent No.: US 10,120,660 B2
(45) Date of Patent: Nov. 6, 2018

(54) SYSTEMS AND METHODS FOR PRODUCING LAUNCHERS FOR A MOBILE TERMINAL

(71) Applicant: Huizhou TCL Mobile Communication Co., Ltd, Huizhou, Guangdong (CN)

(72) Inventors: Julan Chen, Huizhou (CN); Qiujuan Xie, Huizhou (CN); Fan Yang, Huizhou (CN); Jiaqiong Feng, Huizhou (CN); Qian Zhou, Huizhou (CN)

(73) Assignee: Huizhou TCL Mobile Communication Co., Ltd, Huizhou (CN)

( * ) Notice: Subject to any disclaimer, the term of this patent is extended or adjusted under 35 U.S.C. 154(b) by 22 days.

(21) Appl. No.: 15/506,697

(22) PCT Filed: Sep. 2, 2016

(86) PCT No.: PCT/CN2016/097862
§ 371 (c)(1),
(2) Date: Feb. 24, 2017

(87) PCT Pub. No.: WO2017/067335
PCT Pub. Date: Apr. 27, 2017

(65) Prior Publication Data
US 2018/0225098 A1      Aug. 9, 2018

(30) Foreign Application Priority Data
Oct. 20, 2015 (CN) .......................... 2015 1 0688172

(51) Int. Cl.
*G06F 9/44* (2018.01)
*G06F 8/38* (2018.01)
(Continued)

(52) U.S. Cl.
CPC .................. *G06F 8/38* (2013.01); *G06F 8/41* (2013.01); *G06F 8/61* (2013.01); *G06F 8/76* (2013.01);
(Continued)

(58) Field of Classification Search
CPC ....................................................... G06F 9/44
(Continued)

(56) References Cited

U.S. PATENT DOCUMENTS

| 9,398,462 B1* | 7/2016 | Delker .................. H04W 12/08 |
| 2009/0055749 A1* | 2/2009 | Chatterjee ........... G06F 3/04817 715/738 |

(Continued)

FOREIGN PATENT DOCUMENTS

| CN | 101071374 A | 11/2007 |
| CN | 103793129 A | 5/2014 |

(Continued)

OTHER PUBLICATIONS

International Search Report on corresponding PCT application (PCT/CN2016/097862) from International Searching Authority (CN) dated Dec. 7, 2016.

*Primary Examiner* — Jae U Jeon

(57) ABSTRACT

A method of producing launchers for a mobile terminal is disclosed. The method includes: obtaining launcher main code having an architecture of at least two launchers; extracting form the launcher main code a corresponding first parsed XML file and first macro definition .inc file of each of the at least two launchers, and generating a second XML file using the attribute information of all applications in the launcher main code; customizing the first XML file and first .inc file of each launcher and the second XML file to obtain a corresponding second .inc file of the launcher; generating a corresponding third XML file of each of the at least two (Continued)

launchers using the corresponding second .inc file and first XML file of the launcher; and compiling the corresponding third XML file to obtain the at least two launchers. A system for producing launchers for the mobile terminal is disclosed.

20 Claims, 3 Drawing Sheets

(51) Int. Cl.
    *G06F 8/61*     (2018.01)
    *G06F 9/451*     (2018.01)
    *G06F 8/76*     (2018.01)
    *G06F 8/41*     (2018.01)
    G06F 17/21     (2006.01)
    G06F 17/27     (2006.01)

(52) U.S. Cl.
    CPC ............ *G06F 9/451* (2018.02); *G06F 17/218* (2013.01); *G06F 17/2705* (2013.01)

(58) Field of Classification Search
    USPC .................................................. 717/106–134
    See application file for complete search history.

(56) References Cited

U.S. PATENT DOCUMENTS

| | | | | |
|---|---|---|---|---|
| 2010/0152622 | A1* | 6/2010 | Teulings | A61B 5/1101 600/595 |
| 2012/0054753 | A1* | 3/2012 | Nagasaka | G06F 9/453 718/100 |
| 2015/0188983 | A1* | 7/2015 | Elias | G06F 9/445 726/4 |
| 2017/0344218 | A1* | 11/2017 | Jann | G06F 3/04845 |

FOREIGN PATENT DOCUMENTS

| | | |
|---|---|---|
| CN | 104317587 A | 1/2015 |
| CN | 104915201 A | 9/2015 |
| CN | 105373381 A | 3/2016 |

* cited by examiner

SYSTEMS AND METHODS FOR PRODUCING LAUNCHERS FOR A MOBILE TERMINAL

CROSS-REFERENCE TO RELATED APPLICATIONS

The present application is a 35 U.S.C. § 371 National Phase conversion of International (PCT) Patent Application No. PCT/CN2016/097862 filed Sep. 2, 2016, which claims foreign priority of Chinese Patent Application No. 201510688172.7, filed on Oct. 20, 2015 in the State Intellectual Property Office of China, the contents of all of which are hereby incorporated by reference.

TECHNICAL FIELD

The field of the present disclosure generally relates to mobile terminals, and more particularly relates to systems and methods for producing launchers for a mobile terminal.

BACKGROUND

With the rapid development and progress of modern electronic technologies, electronic devices, especially smart phones, have been widely and intensely used in people's lives. In the meantime, customers are having more and more diversified demands on the smart phone interface. For example, different age groups of consumers may have different demands on the theme, wallpaper, layout, application operation mode, etc. Common demands may include launchers customized for the elderly, launchers customized for children, standard launchers, and carrier-customized launchers. However, most of the smart phones sold on the current market feature a single launcher, which has been unable to meet the demands of different age groups for a variety of interface styles.

SUMMARY

Embodiments of the present disclosure provide simple and fast methods and associated systems for producing launchers for a mobile terminal to fulfill the demands of multiple age groups for a variety of interface styles.

There is provided a method of producing launchers for a mobile terminal, the method comprising:
obtaining launcher main code having an architecture of at least two launchers;
extracting from the launcher main code a corresponding first parsed XML file and first macro definition .inc file of each of the at least two launchers, and generating a second XML file using the attribute information of all applications in the launcher main code;
reading the information of the first XML file of each launcher and the second XML file using a hypertext preprocessor (PHP), and displaying the layouts of the at least two launchers as windows through PHP programming;
customizing the at least two launchers to obtain a corresponding second .inc file of each launcher, the customized contents being written into the second .inc file by way of an array;
generating a corresponding third XML file of each launcher using the corresponding second .inc file and first XML file of the launcher;
saving the third XML file of each launcher in ZIP format;
decompressing and compiling the third XML file of each launcher and the launcher main code that are saved in ZIP format, the third XML saved in the ZIP format being used to generate a client-customized graphics package file for the corresponding launcher; and
downloading a file compiled from the launcher main code and the client-customized graphics package file of each launcher to the mobile terminal, which in turn installs the at least two launchers.

The layout information of the at least two launchers may comprise a number of screens, screen layout, and applications, of each launcher.

Types customized for the at least two launchers may comprise applications, folders, navigation bars, application widgets, or favorites.

Customization of the applications may be performed through one of the folders, navigation bars, and application widgets, or performed on a customization interface.

The third XML file saved in the ZIP format may be written into the launcher main code concurrently as decompressing and compiling the third XML file.

The first XML file and first .inc file of each launcher, and the second XML file may be stored in a same data directory of a desired customized version.

The respective first .inc files of the at least two launchers may be the same file.

There is provided another method of producing launchers for a mobile terminal, the method comprising:
obtaining launcher main code having an architecture of at least two launchers;
extracting from the launcher main code a corresponding first parsed XML file and first macro definition .inc file of each of the at least two launchers, and generating a second XML file using the attribute information of all applications in the launcher main code;
customizing the first XML file and the first .inc file of each launcher, and the second XML file to obtain a corresponding second .inc file of the launcher;
generating a corresponding third XML file of each launcher using the corresponding second .inc file and first XML file of the launcher; and
compiling the third XML file of each launcher to obtain the at least two launchers.

Customizing the first XML file and the first .inc file of each launcher, and the second XML file to obtain the corresponding second .inc file of the launcher may comprise:
reading the information of the first XML file and the second XML file of the launcher through a PHP, and displaying the layouts of the at least two launchers as windows; and
customizing the at least two launchers to obtain a corresponding second .inc file of the launcher, the customized contents being written into the second .inc file by way of an array.

The layout information of the at least two launchers may comprise a number of screens, screen layout, and applications, of each launcher.

Types customized for the at least two launchers may comprise applications, folders, navigation bars, application widgets, or favorites.

Customization of the applications may be performed through one of the folders, navigation bars, and application widgets, or performed on a customization interface.

Compiling the third XML file of each launcher to obtain the at least two launchers may comprise:
saving the third XML file in ZIP format;
decompressing and compiling the third XML file saved in the ZIP format and the launcher main code, the third XML file saved in the ZIP format being used to generate a client-customized graphics package file for the corresponding launcher; and downloading a file compiled from the launcher main code and the client-customized graphics package file of each launcher to the mobile terminal, which in turn may install the at least two launchers. The third XML file saved in the ZIP format may be written into the launcher main code concurrently as decompressing and compiling the third XML file.

The first XML file and first .inc file of each launcher, and the second XML may be stored in a same data directory of the desired customized version.

The respective first .inc files of the at least two launchers may be the same file.

There is also provided a system for producing launchers for a mobile terminal, the system comprising:

a production module configured to: extract from the launcher main code a corresponding first parsed XML file and first macro definition .inc file of each of the at least two launchers, and generate a second XML file using the attribute information of all applications in the launcher main code; customize the first XML file and the first .inc file of each launcher and the second XML to obtain a corresponding second .inc file of the launcher; and generate a corresponding third XML file of each launcher using the corresponding second .inc file and first XML file of the launcher; and a compilation module configured to compile the third XML file of each of the at least two launchers to obtain the at least two launchers.

According to the present disclosure, the launcher main code having an architecture of at least two launchers is first obtained, and a corresponding first XML file and first .inc file are extracted from the launcher main code while the attribute information of all applications in the launcher main code are used to generate a second XML file. Then the first XML file and first .inc file of each launcher together with the second XML file are customized to obtain a second .inc file, and further a third XML file corresponding to each launcher is generated and is finally compiled to obtain the at least two launchers. Thus, the present disclosure can fulfill the customization demands of different customers, greatly reduce the development and testing time, shorten the software lifecycle, and improve the R&D efficiency. As such, different age groups of customers can choose a desired launcher according to his/her own personal needs.

DETAILED DESCRIPTION

Hereinafter, implementations of the present disclosure will be described in definite and comprehensive details in connection with exemplary embodiments with reference to the accompanying drawings.

Figure 1:
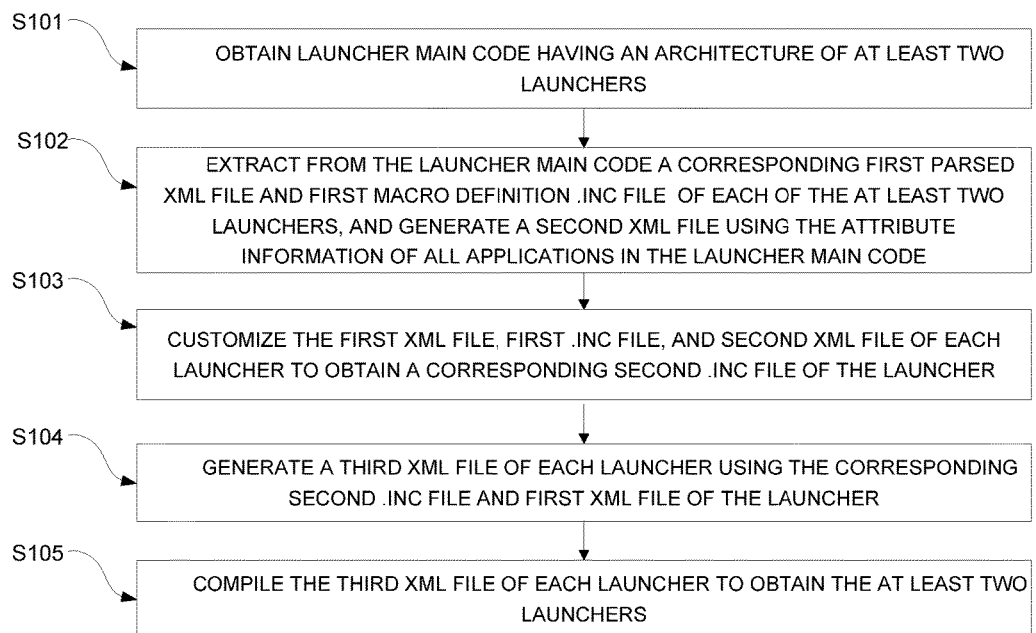
FIG. 1 depicts a flowchart illustrating a first embodiment of a method of producing launchers for a mobile terminal according to the disclosure.

FIG. 1 depicts a flowchart illustrating a first embodiment of a method of producing launchers for a mobile terminal according to the disclosure. The method may comprise the following blocks.

In S101, the method includes obtaining launcher main code having an architecture of at least two launchers.

The launcher main code may contain the parsed files of at least two launchers, and so can be used to produce at least two launchers, which in turn allows the mobile terminal to install at least two launchers.

In S102, the method includes extracting from the launcher main code a corresponding first parsed extensible markup language (XML) file and first macro definition .inc file of each of the at least two launchers, and generating a second XML file using the attribute information of all applications in the launcher main code.

The respective first parsed XML files of the at least two launchers may be the same or different, while their respective first macro definition .inc files may be the same.

It will be appreciated that the attribute information of all applications in the launcher main code may comprise the storage path, label, package, launch able activity, and widget class of each application in the launcher main code.

The first XML file and the first .inc file of each launcher together with the second XML file may be stored in a same data directory of the desired customized version.

In S103, the method includes customizing the first XML file and the first .inc file of each launcher as well as the second XML file to obtain a corresponding second .inc file of the launcher.

In S104, the method includes generating a corresponding third XML file of each of the at least two launchers using the corresponding second .inc file and first XML file of the launcher.

In S105, the method includes compiling the third XML file of each of the at least two launchers to obtain the at least two launchers.

According to the method of producing launchers for a mobile terminal described in the above embodiment, the launcher main code having an architecture of at least two launchers is first obtained, and a corresponding first XML file and first .inc file of each of the at least two launchers are extracted from the launcher main code while the attribute information of all applications in the launcher main code is used to generate a second XML file. The first XML file and first .inc file of each of the at least two launchers together with the second XML file are then customized to obtain a second .inc file, and further, a corresponding third XML file of each of the at least two launchers is generated and is finally compiled to obtain the at least two launchers. Thus, the present embodiment can fulfill the customization demands of different customers, greatly reduce the development and testing time, shorten the software lifecycle, and improve the R&D efficiency. As such, different age groups of customers can choose a desired launcher according to his or her own personal needs.

Figure 2:
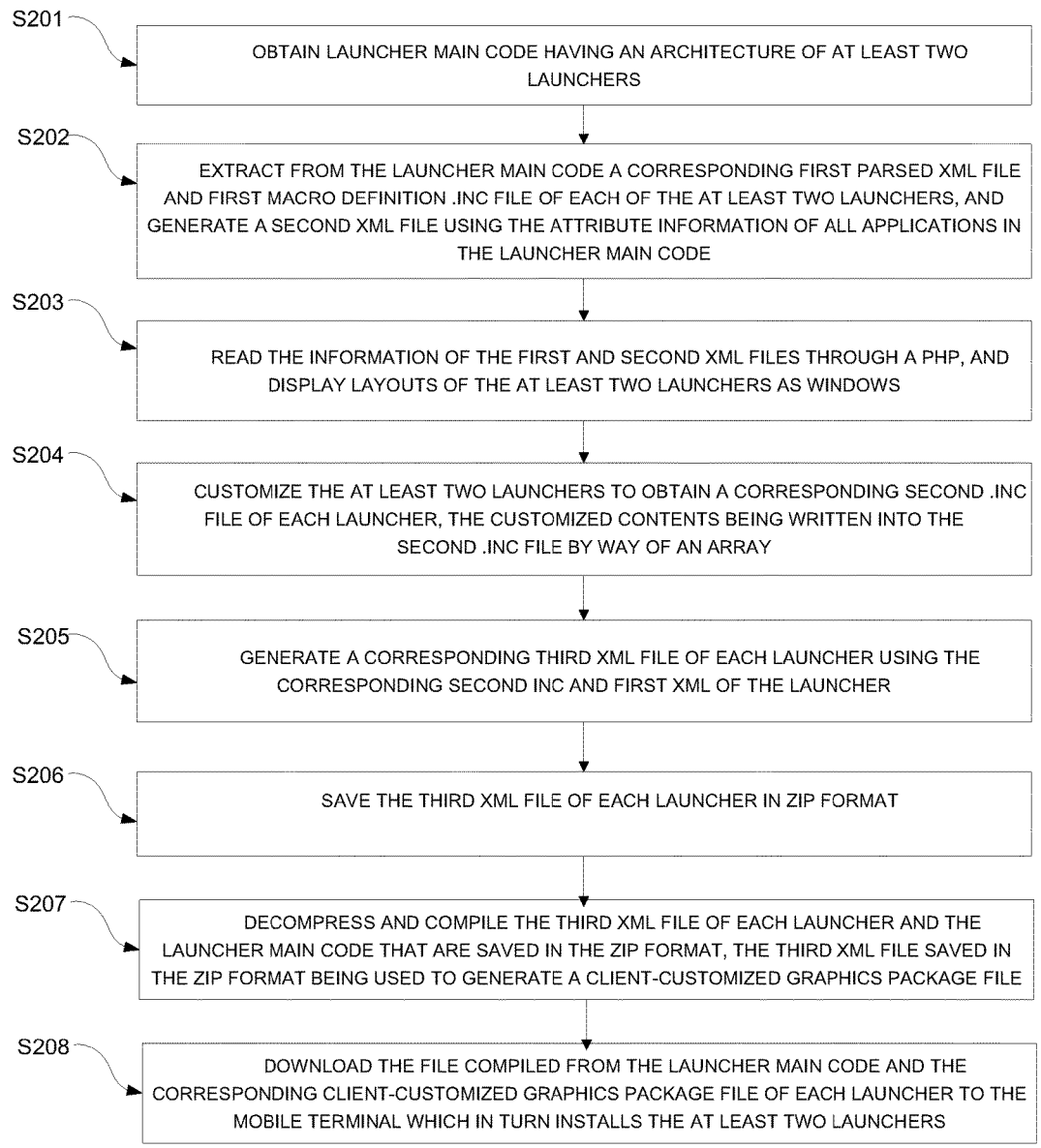
FIG. 2 depicts a flowchart illustrating a second embodiment of the method of producing launchers for a mobile terminal according to the disclosure.

FIG. 2 depicts a flowchart illustrating a second embodiment of a method of producing launchers for a mobile terminal according to the disclosure. The method may comprise the following blocks.

In S201, the method includes obtaining launcher main code having an architecture of at least two launchers.

In S202, the method includes extracting from the launcher main code a corresponding first parsed file XML and first macro definition .inc file of each of the at least two launchers, and generating a second XML file using the attribute information of all applications in the launcher main code.

In S203, the method includes reading the information of the first and second XML files using a hypertext preprocessor (PHP), and displaying the layouts of the at least two launchers as windows.

The layouts of the at least two launchers that are displayed as windows may comprise information including a number of screens, screen layout, and applications, where the windows can be, but is not limited to, browsers.

Types customized for the at least two launchers may comprise applications, folders, navigation bars, application widgets, or favorites. Customization for the applications may be performed through one of the folders, navigation bars, and application widgets, or performed on a customization interface.

In S204, the method includes customizing the at least two launchers to obtain a corresponding second .inc file of each of the at least two launchers, the customized contents being written into the second .inc file by way of an array.

In S205, the method includes generating a third XML file of each of the at least two launchers using the corresponding second .inc file and first XML file of the launcher.

In S206, the method includes saving the third XML file in ZIP format.

The third XML file can be stored in ZIP format in the directory of the compressed file (perso zip).

In S207, the method includes decompressing and compiling the third XML file of each launcher that is saved in the ZIP format and the launcher main code, where the third XML file may be used to generate a corresponding client-customized graphics package (custpack.img) file of the launcher.

The third XML file may be written into the launcher main code concurrently when decompressing and compiling the third XML file and the launcher main code saved in the ZIP format.

In S208, the method includes downloading a file compiled from the launcher main code and the corresponding client-customized graphics package file of each launcher to the mobile terminal, which, in turn, can install the at least two launchers.

According to the method described in the above embodiment, the launcher main code having an architecture of at least two launchers is first obtained, and a first XML file and first .inc file are extracted from the launcher main code while the attribute information of all applications in the launcher main code are used to generate a second XML file. The first XML file and first .inc file of each launcher together with the second XML file are then customized to obtain a second .inc file, and further, a corresponding third XML file of each of the at least two launchers is generated and is finally compiled to obtain the at least two launchers where multiple components in the at least two launchers can be customized. Thus, the method in the present embodiment can fulfill the customization demands of different customers, greatly reduce the development and testing time, shorten the software lifecycle, and improve the R&D efficiency. As such, different age groups of customers can choose a desired launcher according to his/her own personal needs.

Figure 3:
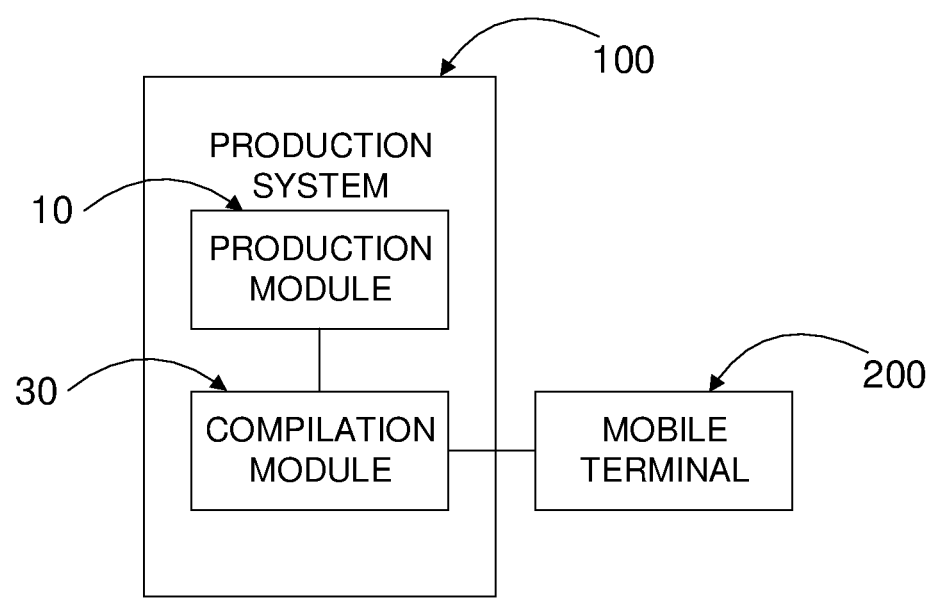
FIG. 3 depicts a block diagram illustrating a system for producing a launcher for a mobile terminal according to an embodiment of the disclosure.

FIG. 3 depicts a block diagram illustrating a system 100 for producing launchers for a mobile terminal according to an embodiment of the disclosure. The system 100 comprises a production module 10 and a compilation module 30, the production system 100 being coupled to a mobile terminal 200.

The production module 10 may be configured to: extract from the launcher main code a corresponding first parsed file XML and first macro definition .inc file of each of the at least two launchers, and generate a second XML file using the attribute information of all applications in the launcher main code; customize the first XML file and first .inc file of each launcher and the second XML file to obtain a corresponding second .inc file of each of the at least two launchers; and generate a corresponding third XML file of each launcher using the corresponding second .inc file and first XML file of the launcher.

The compilation module 30 may be configured to compile the third XML file of each of the at least two launchers to finally obtain the at least two launchers.

The mobile terminal 200 may be configured to install the at least two launchers that are created by the production system 100.

According to the embodiment described above, the launcher production system 100 comprises the production module 10 configured to customize the XML file of the launcher main code containing at least two launchers so as to fulfill different customization demands, greatly reducing the R&D and testing time, shortening the software life cycle, and improving the R&D efficiency.

Furthermore, it is apparent to those skilled in the art that the present disclosure also provides a system for producing launchers for a mobile terminal, the system comprising a non-transitory program storage medium and one or more processors. The non-transitory program storage medium stores program code executable by the processor(s) to perform the methods as described above. Furthermore, it is apparent to those skilled in the art that various units or modules 10 and 30, as shown in FIG. 3, can be software modules or software units. In another aspect, it is well-known that various software modules or software units can be inherently stored in the non-transitory program storage medium and executed by the processor(s).

The foregoing specification merely depicts some exemplary embodiments of the present disclosure rather than limits the scope of the disclosure. It will be evident that various structural or flow modifications may be made to the disclosure or the disclosure may be directly or indirectly applied on any other related fields, where all these modifications or applications shall fall in the scope of the disclosure.

What is claimed is:

1. A method of producing launchers for a mobile terminal, the method comprising:
    obtaining launcher main code having an architecture of at least two launchers;
    extracting from the launcher main code a corresponding first parsed XML file and first macro definition .inc file of each of the at least two launchers, and generating a second XML file using attribute information of all applications in the launcher main code;
    reading information of the first and second XML files of each of the at least two launchers using a hypertext preprocessor (PHP), and displaying layouts of the at least two launchers as windows by PHP programming; and
    customizing the at least two launchers to obtain a corresponding second .inc file of each of the at least two launchers, the customized contents being written into the second .inc file by way of an array;
    generating a corresponding third XML file of each of the at least two launchers using the corresponding second .inc file and first XML of the launcher;
    saving the third XML file of each of the at least two launchers in ZIP format;

decompressing and compiling the third XML file saved in the ZIP format and the launcher main code, the third XML file being used to generate a corresponding client-customized graphics package file for each of the at least two launchers;

downloading a file compiled from the launcher main code and the client-customized graphics package file of each of the at least two launchers to the mobile terminal; and installing, by the mobile terminal, the at least two launchers.

2. The method according to claim 1, wherein the layout information of the at least two launchers comprises a number of screens, screen layout, and applications, of each launcher.

3. The method according to claim 1, wherein types customized for the at least two launchers comprise applications, folders, navigation bars, application widgets, or favorites.

4. The method according to claim 3, wherein customization for the applications is performed through one of the folders, navigation bars, and application widgets, or performed on a customization interface.

5. The method according to claim 1, wherein the third XML file is written into the launcher main code concurrently when decompressing and compiling the third XML file saved in the ZIP format.

6. The method according to claim 1, wherein the first XML files and the first .inc files of the at least two launchers and the second XML file are stored in a same data directory of a desired customized version.

7. The method according to claim 1, wherein the respective first .inc files of the at least two launchers are the same file.

8. The method according to claim 1, wherein the windows are browsers.

9. The method according to claim 1, wherein the corresponding first parsed XML files of the at least two launchers are the same, and the corresponding first macro definition .inc files of the at least two launchers are the same.

10. The method according to claim 1, wherein the corresponding first parsed XML files of the at least two launchers are different, and the corresponding first macro definition .inc files of the at least two launchers are the same.

11. A method of producing launchers for a mobile terminal, the method comprising:

obtaining launcher main code having an architecture of at least two launchers;

extracting from the launcher main code a corresponding first parsed XML file and first macro definition .inc file of each of the at least two launchers, and generating a second XML file using attribute information of all applications in the launcher main code;

customizing the first XML file and the first .inc file of each of the at least two launchers and the second XML file to obtain a corresponding second .inc file of the launcher;

generating a corresponding third XML file of each of the at least two launchers using the corresponding second .inc file and first XML file of the launcher; and compiling the third XML file of each of the at least two launchers to obtain the at least two launchers.

12. The method according to claim 11, wherein customizing the first XML file and the first .inc file of each of the at least two launchers and the second XML file to obtain the corresponding second .inc file of the launcher comprises:

reading information of the first and second XML files of each of the at least two launchers using a hypertext preprocessor (PHP), and displaying layouts of the at least two launchers as windows by PHP programming; and customizing the at least two launchers to obtain a corresponding second .inc file of each of the at least two launchers, the customized contents being written into the second .inc file by way of an array.

13. The method according to claim 12, wherein the layout information of the at least two launchers comprises a number of screens, screen layout, and applications, of each launcher.

14. The method according to claim 12, wherein types customized for the at least two launchers comprise applications, folders, navigation bars, application widgets, or favorites.

15. The method according to claim 14, wherein customization for the applications is performed through one of the folders, navigation bars, and application widgets, or performed on a customization interface.

16. The method according to claim 11, wherein compiling the third XML file of each of the at least two launchers to obtain the at least two launchers comprises:

saving the third XML file of each of the at least two launchers in ZIP format;

decompressing and compiling the third XML file of each launcher that is saved in the ZIP format and the launcher main code, the third XML file being used to generate a corresponding client-customized graphics package file for the launcher; and downloading a file compiled from the launcher main code and the client-customized graphics package file of each launcher to the mobile terminal; and installing, by the mobile terminal, the at least two launchers.

17. The method according to claim 16, wherein the third XML file is written into the launcher main code concurrently when decompressing and compiling the third XML file saved in the ZIP format.

18. The method according to claim 11, wherein the first XML files and the first .inc files of the at least two launchers and the second XML file are stored in a same data directory of the desired customized version.

19. The method according to claim 11, wherein the respective first inc files of the at least two launchers are the same file.

20. A system for producing launchers for a mobile terminal, the system comprising one or more processors and a non-transitory program storage medium containing program code executable by the one or more processors, the program code comprising:

a production module configured to: extract from launcher main code a corresponding first parsed XML file and first macro definition .inc file of each of the at least two launchers, and generate a second XML file using attribute information of all applications in the launcher main code; customize the first XML file and the first .inc file of each launcher and the second XML file to obtain a corresponding second .inc file of the launcher; and generate a corresponding third XML file of each of the at least two launchers using the corresponding second .inc file and first XML file of the launcher; and a compilation module configured to compile the third XML file of each of the at least two launchers to obtain the at least two launchers.

* * * * *